United States Patent
Honda

(10) Patent No.: US 10,080,106 B2
(45) Date of Patent: Sep. 18, 2018

(54) SYSTEM AND METHOD FOR PROCESSING PERSONAL IDENTIFICATION INFORMATION BASED ON POSITION INFORMATION

(71) Applicant: Takashi Honda, Tokyo (JP)

(72) Inventor: Takashi Honda, Tokyo (JP)

( * ) Notice: Subject to any disclaimer, the term of this patent is extended or adjusted under 35 U.S.C. 154(b) by 0 days.

(21) Appl. No.: 15/612,866

(22) Filed: Jun. 2, 2017

(65) Prior Publication Data
US 2017/0272915 A1 Sep. 21, 2017

Related U.S. Application Data

(63) Continuation of application No. PCT/JP2015/083946, filed on Dec. 3, 2015.

(30) Foreign Application Priority Data

Dec. 13, 2014 (JP) .................................. 2014-252537

(51) Int. Cl.
*H04W 4/029* (2018.01)
*H04L 29/06* (2006.01)
(Continued)

(52) U.S. Cl.
CPC .......... *H04W 4/029* (2018.02); *G06F 21/316* (2013.01); *H04L 63/083* (2013.01);
(Continued)

(58) Field of Classification Search
CPC ... H04W 12/027; H04W 12/28; H04W 12/02; H04W 12/06; H04W 12/08; H04W 4/02; H04W 4/206
See application file for complete search history.

(56) References Cited

U.S. PATENT DOCUMENTS

| 8,311,480 B2 * | 11/2012 | Nagata .............. H04M 1/72572 340/539.11 |
| 2012/0203599 A1 * | 8/2012 | Choi ..................... G06Q 30/02 705/13 |

(Continued)

FOREIGN PATENT DOCUMENTS

JP 2005286955 A 10/2005
JP 2006331048 A 12/2006
(Continued)

OTHER PUBLICATIONS

International Search Report issued to PCT/JP2015/083946.
International Preliminary Report on Patentability issued to PCT/JP2015/083946.

*Primary Examiner* — Jean Gelin
(74) *Attorney, Agent, or Firm* — Konomi Takeshita

(57) ABSTRACT

There is provided means for identifying whether or not users of mobile information terminals (mobile information terminals) in a network service are the same as or different from one another. Location information 151, 152 is obtained by the mobile information terminals 121 each comprising a GPS function, and location information 151 representing a resident state at a home, a workplace or a school is obtained when the mobile information terminal users 123 carry their respective mobile information terminals 121. The location information 151 is specific to each user, and therefore, is used as identification information to differentiate the users to thereby allow identification of the users of the mobile information terminals by a management server 110.

15 Claims, 12 Drawing Sheets

(51) Int. Cl.
*H04W 4/02* (2018.01)
*H04W 12/06* (2009.01)
*H04W 12/08* (2009.01)
*G06F 21/31* (2013.01)
*H04W 88/02* (2009.01)

(52) U.S. Cl.
CPC ........ *H04L 63/0861* (2013.01); *H04L 63/107* (2013.01); *H04W 4/027* (2013.01); *H04W 4/028* (2013.01); *H04W 12/06* (2013.01); *H04W 12/08* (2013.01); *G06F 2221/2111* (2013.01); *H04W 88/02* (2013.01)

(56) References Cited

U.S. PATENT DOCUMENTS

2013/0275881 A1* 10/2013 Hahm ................... H04L 51/32
                                                    715/752
2015/0087233 A1*  3/2015 Kim .................. H04W 76/023
                                                    455/41.2
2016/0308969 A1* 10/2016 Aihara .................. G06Q 50/22
2016/0330785 A1* 11/2016 Chang ................. H04W 76/046

FOREIGN PATENT DOCUMENTS

| JP | 2011171876 A | 9/2011 |
| JP | 2012-118934 A | 6/2012 |
| JP | 201496172 A | 5/2014 |

\* cited by examiner

| User ID for Access Permission | Password |
|---|---|
| 0001 | ××××× |
| 0002 | ○○○○○ |
| 0003 | △△△△△ |
| 0004 | ×○×○× |
| 0005 | ▲▲▲▲▲ |
| ... | ... |

301 — User ID for Access Permission column
302 — Password column
311, 312, 313, 314, 315 — rows

FIG. 3

| | | 401 | | 402 | | 403 | | 404 | |
|---|---|---|---|---|---|---|---|---|---|
| | User ID for Access Permission | Resident Characteristics Information 1 | | Resident Characteristics Information 2 | | Resident Characteristics Information 3 | | Resident Characteristics Information.... | |
| | | 411 | 412 | 413 | 414 | 415 | 416 | 417 | 418 |
| | | $x$ | $y$ | $x$ | $y$ | $x$ | $y$ | $x$ | $y$ |
| 421 | 01 | 01 | 01 | 10 | 10 | 11 | 11 | | |
| 422 | 02 | 02 | 02 | 10 | 10 | | | | |
| 423 | 03 | 02 | 02 | 10 | 10 | | | | |
| 424 | 04 | 01 | 01 | 14 | 14 | | | | |
| 425 | 05 | 01 | 01 | 14 | 14 | | | | |
| 426 | 06 | 01 | 01 | 14 | 14 | | | | |
| 427 | 07 | | | | | | | | |

FIG. 4

| User ID for Access Permission | ID for User Identification |
|---|---|
| 0001 | 01011010 |
| 0002 | 02021010 |
| 0003 | 02021010 |
| 0004 | 01011414 |
| 0005 | 01011414 |
| 0006 | 01011414 |
| 0007 | |

FIG. 5

SYSTEM AND METHOD FOR PROCESSING PERSONAL IDENTIFICATION INFORMATION BASED ON POSITION INFORMATION

CROSS REFERENCE TO RELATED APPLICATIONS

This application claims priority under 35 U.S.C. 365(c) and 35 U.S.C. 120 based upon International Patent Application No. PCT/JP2015/083946, filed on Dec. 3, 2015, which claims priority under 35 U.S.C. 119 based upon Japanese Patent Application Serial No. 2014-252537, filed on Dec. 13, 2014. The entire disclosures of the aforesaid applications are incorporated herein by reference.

FIELD OF THE INVENTION

The present invention relates to an individual identification information processing system, an individual identification information processing method, computer programs, computer program storage media and the like. Specifically, it relates to an information processing system and method as well as computer programs, computer program storage media and the like for identifying a user of a mobile information terminal based on location (position) information, etc. obtained by the mobile information terminal.

BACKGROUND OF THE INVENTION

When services are provided to users over the Internet or private networks, methods for granting access authority to a user include methods for performing authentication via a user ID and a password, by an IC card authentication device or a biometrics authentication device and the like.

For authentication by an IC card authentication device or a biometrics authentication device, etc., issuing a user ID to a particular individual and granting access authority to the user generally involve the user presenting a document and the like to provide the user's personal information to a service provider so that the user is identified, registered and granted access authority. Thus, an individual may be identified and authenticated, but the above procedure involves verifying the user's personal information such as the user's real name and address in advance. The service providers are required to put forth a great effort on these verification procedures and make investments in facilities and equipment for performing the verification procedures. Some users avoid the registration in order to avoid cumbersome procedures or having to entrust others with the users' personal information. Also, when using an IC card authentication device or a biometrics authentication device, some avoid obtaining required devices due to the costs for obtaining a mobile information terminal (hereinafter, referred to "mobile information terminal") and the authentication device additionally required, not to mention laborious initial configuration of the devices.

On the other hand, network services such as social networks having a large user base and benefitting from high volume of user information, are simplifying the registration procedures and authentication processes for individual authentication because cumbersome individual authentication hinders the growth of registered user base. For the same reason, they often grant access authority to their users without requiring their personal information, or accept registration of the personal information by trusting information submitted by each individual and not requiring the individual's identification document.

However, when the access authority is granted in such manners, users can register themselves with incorrect information. Since false name can be registered, one individual can obtain a plurality of user IDs. In such a simplified individual authentication system, it is difficult to correctly identify individuals as users. In other words, it becomes difficult for a system administrator to control services provided to the individuals as users.

For example, terminating services for a particular individual may not be possible by simply intercepting the individual's registered user ID account if the individual has obtained more than one user IDs.

Also, it is impossible to use both of the authentication via a user ID and a password, and the authentication using an IC card authentication device or a biometrics authentication device to accurately identify and authenticate individuals. If an individual uses a false name to register himself or herself as a user during the authentication via a user ID and a password, the same individual can obtain a plurality of access rights, resulting in inaccurate registrations.

Thus, in the conventional individual authentication technologies, simplified individual authentication makes it impossible to identify individuals accurately, and accurate individual identification prevents the growth of network service user base due to the increased procedures and costs, resulting in a tradeoff between the simplified and accurate individual authentication. In other words, there has been no technology for providing users with simplified individual authentication while identifying individuals as users.

On the other hand, the other individual authentication methods include a method for individual authentication using user-specific behavioral pattern information (Patent Document 1) and a method for individual authentication through questions and answers regarding a user's behavioral history (Patent Document 2).

By nature, these techniques are ones as individual authentication methods for controlling user access to an object of security management, but not techniques for identifying individuals as users of mobile information terminals.

In order to identify a particular individual, there is needed unique information which enables to identify the particular individual among all other individuals, and a mechanism which enables to efficiently compare and differentiate the identification information of the particular individual and all other individuals. Patent Documents 1 and 2 merely disclose methods for verifying if an individual as a user has an access authority, but do not offer unique identification information which allows identification of a particular individual among others.

In the technique of Patent Document 1 using a user-specific behavioral pattern information to authenticate an individual, user travel path information may be used as identification information for each user since the user-specific behavioral pattern consists of the user's travel paths recorded in advance, and since the individual authentication is performed by comparing the user's travel paths with a behavioral path of a user at the time of the user's access.

However, compared to location information of one or two locations, the travel path information has more information and more complex data, requiring complicated and laborious tasks when comparing the travel path information of different users. Also, note that Patent Document 1 does not offer means for comparing the travel path information from each other and determining whether they are the same or different.

Additionally, in this method, the identification information may be generated only when a user continually takes an identical travel path. In other words, for a user without consistent travel paths or without habitual travel patterns, the identification information may not be generated. Thus, a network service requiring a large-scale user base may not be constructed on a system incapable of granting access authority to a user unless the user meets particular conditions.

Further, the GPS function of general-purpose mobile information terminals do not consistently provide accurate positioning, often resulting in errors in the location information. Those errors make it difficult to compare and identify the travel path information.

Thus, in the above individual authentication method, it is difficult to identify an individual as a user of a mobile information terminal and differentiate the individual from others.

The method for individual authentication through questions and answers regarding the user behavioral history of Patent Document 2 uses the user's behavioral history including information on a purchased product, a ticket gate, and date and time related to the user to authenticate an individual.

In this individual authentication method, personal information needs to be registered in advance in order to obtain the information on the products the user purchases, ticket gates that the user goes through, etc., and therefore, this method requires identification of each individual for accurate individual authentication. That is, the accurate individual authentication increases the required procedures and cost, and may discourage the user base growth in the network services.

As such, neither of the above conventional techniques for individual authentication may be easily used to concomitantly identify each user.

Unlike either of these individual authentication techniques, the present invention provides users with simplified individual authentication procedures while allowing identification of an individual as a user of a mobile information terminal from the other users. This identification is not done at the level of user IDs, but rather at the level of each individual using the mobile information terminal by identifying individuals as users of a network service. For this reason, even if one individual is using a plurality of user IDs, the individual as a user of the user IDs may be identified as one identical individual. Also, even if one individual is using a plurality of mobile information terminals, the individual as the user of the mobile information terminals may be identified as one identical individual. Thus, the technique of the present invention has a broader range of identifiable objects than, and is different from the conventional techniques.

Also, when a user presents the user's personal information to a network service provider to receive access authority, there could be a risk of the user's personal information being leaked depending on the management of the network service provider. For this reason, as a tendency, users have been refraining from presenting their personal information, and thus, many network services have been allowing their users to anonymously register themselves. However, this allows a plurality of registrations by one individual, making it impossible to identify the individual. In other words, there has been a tradeoff problem between allowing the users to use the network service anonymously and identifying individuals as the network service users.

The present invention allows the users to anonymously access network services while enabling identification of an individual as a user of a mobile information terminal from the other users.

SUMMARY OF THE INVENTION

An object of the present invention is to provide an individual identification system, an individual identification method, an individual identification program and an individual identification storage medium for utilizing location information of mobile information terminals each equipped with a GPS function in a network service to thereby identify individuals using the mobile information terminals as users of the network service.

Users of mobile information terminals receiving network services are characterized in that they carry around their mobile information terminals on a daily basis. Also, many of the users are characterized in that they stay at a particular place such as their home, workplace or school while carrying their mobile information terminals for a predetermined time or longer in a stationary state or a small-movement state (hereafter simply referred to as a "resident state"). Further, the place where the resident state occurs varies depending on the mobile information terminal user.

Accordingly, the invention of first aspect is an individual identification information processing system comprising: mobile information terminals each comprising a GPS (Global Positioning System) function, detecting location (position) information and extracting a resident state in which the mobile information terminal is stationary from the detected location information; and a management server comprising an information processing section for comparing and matching location characteristics information representing the resident state received from the mobile information terminals (hereafter simply referred to "resident characteristics information") and identifying users of the mobile information terminal.

The resident characteristics information of each user is not limited to a single item of location information and may include a combination of a plurality of items of location information.

The present invention allows identification of individuals when an individual utilizes one mobile information terminal and uses a plurality of different user IDs, and even when an individual utilizes a plurality of mobile information terminals and uses different user IDs for respective mobile information terminals since the resident characteristics information of the individual as a user of the mobile information terminals will be identical, and therefore, the individual as the user of the plurality of user IDs may be identified as one identical individual.

In other words, the present specification discloses the following invention according to the first aspect.

An individual identification information processing system for identifying users of mobile information terminals, the individual identification information processing system including a plurality of mobile information terminals each comprising a GPS function for detecting location (position) information, and a management server connected to the mobile information terminals via a communication network, for using and processing location information sent from the mobile information terminals, wherein the mobile information terminals each comprises:
means for extracting location (position) characteristics information representing a resident state in which the mobile information terminal is stationary from the detected location information, means for sending the location characteristics information to the management server, wherein the management server comprises:

a first database (DB 1) for storing the location characteristics information sent and obtained from the mobile information terminals; and an information processing section for identifying users of the mobile information terminals based on comparison of the location characteristics information.

Note that the "resident state" of the first aspect refers to a state of continual stay at a particular place in a stationary state or a small-movement state for a predetermined time or longer.

Also, as used herein the "small-movement state" refers to a state of slight movement and is exemplified by moving within a building such as a home, a workplace, a school, etc.

Users of mobile information terminals receiving network services are characterized in that they carry around their mobile information terminals on a daily basis. Moreover, the mobile information terminal users are characterized in that location information representing a moving state of the mobile information terminal represented by its location, velocity, etc. during an approximately same time period varies depending on the mobile information terminal user.

Accordingly, the invention of a second aspect is an individual identification information processing system comprising mobile information terminals each comprising a GPS function, detecting location (position) information and extracting location (position) characteristics information representing a moving state in which a plurality of mobile information terminals in question are in motion at an approximately same time (hereafter simply referred to as "dynamic characteristics information"); and a management server comprising an information processing section for comparing and matching the dynamic characteristics information of the respective users received from their mobile information terminals and identifying the mobile information terminal users.

The dynamic characteristics information includes the mobile information terminal's information such as a location and a velocity as well as information obtained through an accelerometer, a vibrometer, a gyroscope, etc.

In other words, the present specification discloses the following invention according to the second aspect:

An individual identification information processing system for identifying individuals using mobile information terminals, the individual identification information processing system including a plurality of mobile information terminals each comprising a GPS function for detecting location information, and a management server connected to the mobile information terminals via a communication network, for using and processing location information sent from the mobile information terminals, wherein the mobile information terminals each comprises:

means for detecting the location information with a GPS function;

means for extracting location characteristics information representing a moving state in which a plurality of mobile information terminals in question are in motion at an approximately same time from the detected location information; and means for sending the location characteristics information to the management server, wherein the management server comprises:

a second database (DB 2) for storing the characteristics information sent and obtained from the mobile information terminals; and an information processing section for identifying users of the mobile information terminals based on comparison of the location characteristics information.

Note that the "at an approximately same time" of the second aspect refers to a point of time with about 30 minutes of time tolerance when the plurality of mobile information terminals extract their respective location characteristics information. The time tolerance varies depending on the location information, etc. in such a way, for example, that the closer a plurality of mobile information terminals in question are with one another, the smaller the time tolerance is made, and the farther those mobile information terminals are with one another, the larger the time tolerance is made, but if, for example, the distance between two mobile information terminals in question is 100 m or less, the time tolerance of 1 min. may be set, and if the distance is 1 km or more, the time tolerance of 10 min. may be set.

As used herein the "moving state" refers to a state in which the mobile information terminals are moving, and is represented by a location, a velocity, an acceleration, a vibration, etc.

The invention of a third aspect is an individual identification information processing system comprising a management server comprising an information processing section for performing the determination of whether or not a mobile information terminal is in the "resident state" as in the invention of the first aspect by determining whether or not the mobile information terminal continually remains in one of "region segments" which are generated by meshing location information space into predetermined areas.

In other words, the present specification discloses the following invention according to the third aspect.

The individual identification information processing system of the first aspect, wherein the mobile information terminal further comprises:

means for extracting location characteristics information representing a resident state in which the mobile information terminal is remaining within any of predetermined region segments; and means for sending the characteristics information to the management server.

The "predetermined region segments" of the third aspect refers to, for example, a collection of regions of two-dimensional location information space segmented by a square grid. The side length of the grid varies according to the nature of the resident characteristics information, and may be set to 10 m, for example. A region shape may be other than square such as polygonal or other shapes.

A mobile information terminal often enters the resident state when it is inside a building such as a home, a workplace or a school. The GPS positioning accuracy is characterized in that it is low when the mobile information terminal user is inside of a building.

Accordingly, the invention of a fourth aspect is an individual identification information processing system comprising mobile information terminals each extracting information as the resident characteristics information that GPS positioning accuracy is continually equal to or less than a predetermined accuracy for a predetermined time or longer when performing the determination of whether or not a mobile information terminal is in the resident state as in the invention of the first aspect.

In other words, the present specification discloses the following invention according to the fourth aspect.

The individual identification information processing system of the first aspect, wherein
the mobile information terminal further comprises means for extracting the location characteristics information as the information representing the resident state in which the mobile information terminal is stationary when positioning accuracy of the GPS function is in a state in which it is continually equal to or less than a predetermined accuracy for a predetermined time or longer.

The "state in which it (i.e., the positioning accuracy) is continually equal to or less than a predetermined accuracy" of the fourth aspect may refer to, for example, when the accuracy level of the GPS function becomes "low" when the positioning accuracy is categorized into three accuracy levels such as "high," "medium" and "low."

Also, as used herein the "predetermined time or longer" refers to, for example, when the resident state continues for one hour or longer.

A mobile information terminal often enters the resident state when it is inside a building such as a home, a workplace or a school. Users of mobile information terminals are characterized in that they charge their mobile information terminals in the building.

Accordingly, the invention of a fifth aspect is an information processing system for identifying individuals comprising mobile information terminals each extracting its charged state as the resident characteristics information when performing the determination of whether or not a mobile information terminal is in the "resident state" as in the invention of the first aspect.

In other words, the present specification discloses the following invention according to the fifth aspect.

The individual identification information processing system of the first aspect, wherein
the mobile information terminal further comprises means for extracting information that the mobile information terminal is in the charged state as the location characteristics information representing the resident information of the mobile information terminal.

Users of mobile information terminals receiving network services are characterized in that they carry around their mobile information terminals on a daily basis. Further, each mobile information terminal has different characteristics on its location and velocity detected by the GPS function at an approximately same time.

Accordingly, the invention of a sixth aspect is an individual identification information processing system comprising mobile information terminals each comprising a GPS function and detecting location information, wherein locations and velocities of a plurality of mobile information terminals in question are extracted at an approximately same time from the detected location information; and a management server comprising an information processing section for comparing and matching the locations and velocities and identifying the mobile information terminal users.

In other words, the present specification discloses the following invention according to the sixth aspect.

An individual identification information processing system for identifying users of mobile information terminals, the individual identification information processing system including a plurality of mobile information terminals each comprising a GPS function for detecting location information, and a management server connected to the mobile information terminals via a communication network, for using and processing location information sent from the mobile information terminals, wherein the mobile information terminals each comprises:
means for detecting the location information with a GPS function;
means for recording a location, a velocity and time information at an approximately same time from the detected location information; and
means for sending the location, the velocity and the time information to the management server,
wherein the management server comprises:
a third database (DB 3) for storing the location, the velocity and the time information sent and obtained from the mobile information terminals; and
an information processing section for identifying users of the mobile information terminals based on the comparison of the location and/or the velocity of a plurality of mobile information terminals in question at an approximately same time from the location, the velocity and the time information sent and obtained from the plurality of mobile information terminals.

Note that the "at an approximately same time" of the sixth aspect refers to a point of time with about 30 minutes of time tolerance when the plurality of mobile information terminals extract their respective location characteristics information. The time tolerance varies depending on the location information, etc. in such a way, for example, that the closer a plurality of mobile information terminals in question are with one another, the smaller the time tolerance is made, and the farther those mobile information terminals are with one another, the larger the time tolerance is made, but if, for example, the distance between two mobile information terminals in question is 100 m or less, the time tolerance of 1 min. may be set, and if the distance is 1 km or more, the time tolerance of 10 min. may be set.

The invention of a seventh aspect is an individual identification information processing method for identifying individuals using mobile information terminals, wherein the mobile information terminals each comprises a GPS function, detects location information and extracts a resident state in which the mobile information terminal is stationary from the detected location information, and wherein an information processing section of a management server compares and matches the resident state received from the mobile information terminals and identifies the mobile information terminal users.

The resident characteristics information of each mobile information terminal is not limited to a single item of location information and may include a combination of a plurality of items of location information.

In other words, the present specification discloses the following invention according to the seventh aspect.

An information processing method for identifying users of mobile information terminals, the information processing method including a plurality of mobile information terminals each comprising a GPS function for detecting location information, and a management server connected to the mobile information terminals via a communication network, for using and processing location information sent from the mobile information terminals, wherein the mobile information terminals each comprises the steps of:
detecting the location information with a GPS function;
extracting location characteristics information representing a resident state in which the mobile information terminal is stationary from the detected location information; and
sending the location characteristics information to the management server, and wherein the management server comprises the steps of:
storing the location characteristics information sent and obtained from the mobile information terminals in a first database (DB 1); and
identifying users of the mobile information terminals based on comparison of the location characteristics information.

Note that the "resident state" of the seventh aspect refers to a state of continual stay at a particular place in a stationary state or a small-movement state for a predetermined time or longer.

Also, as used herein the "small-movement state" refers to a state of slight movement and is exemplified by moving within a building such as a home, a workplace, a school, etc.

The invention of an eighth aspect is an individual identification information processing method for identifying individuals using mobile information terminals, wherein the mobile information terminals each comprises a GPS function, detects location information and extracts dynamic characteristics information, and wherein an information processing section of a management server compares and matches the dynamic characteristics information received from a plurality of mobile information terminals in question and identifies the mobile information terminal users.

The dynamic characteristics information includes the mobile information terminal's information such as a location and a velocity as well as information obtained through an accelerometer, a vibrometer, a gyroscope, etc.

In other words, the present specification discloses the following invention according to the eighth aspect.

An information processing method for identifying users of mobile information terminals, the information processing method including a plurality of mobile information terminals each comprising a GPS function for detecting location information, and a management server connected to the mobile information terminals via a communication network, for using and processing location information sent from the mobile information terminals, wherein
the mobile information terminals each comprises the steps of:
detecting the location information with a GPS function;
extracting location characteristics information representing a moving state in which a plurality of mobile information terminals are in motion at an approximately same time from the detected location information; and
sending the location characteristics information to the management server,
and wherein the management server comprises the steps of:
storing the location characteristics information sent and obtained from the mobile information terminals in a second database (DB 2); and
identifying users of the mobile information terminals based on comparison of the location characteristics information.

Note that the "at an approximately same time" of the eighth aspect refers to a point of time with about 30 minutes of time tolerance when the plurality of mobile information terminals extract their respective location characteristics information. The time tolerance varies depending on the location information, etc. in such a way, for example, that the closer a plurality of mobile information terminals in question are with one another, the smaller the time tolerance is made, and the farther those mobile information terminals are with one another, the larger the time tolerance is made,
but if, for example, the distance between two mobile information terminals in question is 100 m or less, the time tolerance of 1 min. may be set, and if the distance is 1 km or more, the time tolerance of 10 min. may be set.

As used herein the "moving state" refers to a state in which the mobile information terminals are moving, and is represented by a location, a velocity, an acceleration, a vibration, etc.

The invention of a ninth aspect is an individual identification information processing method comprising the step of performing the determination of whether or not a mobile information terminal is in the "resident state" as in the invention of the seventh aspect by determining whether or not the mobile information terminal continually remains in one of "region segments" which are generated by meshing location information space into predetermined areas.

In other words, the present specification discloses the following invention according to the ninth aspect.

The individual identification information processing method of the seventh aspect, wherein
the mobile information terminal further comprises the steps of:
extracting location characteristics information representing a resident state in which the mobile information terminal is remaining within any of predetermined region segments; and
sending the characteristics information to the management server.

The "predetermined region segments" of the ninth aspect refers to, for example, a collection of regions of two-dimensional location information space segmented by a square grid. The side length of the grid varies according to the nature of the resident characteristics information, and is set to 10 m, for example. A region shape may be other than square such as polygonal or other shapes.

The invention of a tenth aspect is an individual identification information processing method, wherein the mobile information terminals each extracts location characteristics information as the resident characteristics information based on the fact that GPS positioning accuracy is continually equal to or less than a predetermined accuracy for a predetermined time or longer when performing the determination of whether or not a mobile information terminal is in the resident state as in the invention of the seventh aspect.

In other words, the present specification discloses the following invention according to the tenth aspect.

The individual identification information processing method of the seventh aspect, wherein
the mobile information terminal further comprises the steps of:
extracting the location characteristics information as the information representing the resident state in which the mobile information terminal is stationary when positioning accuracy of the GPS function is in a state in which it is continually equal to or less than a predetermined accuracy for a predetermined time or longer.

The "state in which it (i.e., the positioning accuracy) is continually equal to or less than a predetermined accuracy" of the tenth aspect may refer to, for example, when the accuracy level of the GPS function becomes "low" when the positioning accuracy is categorized into three accuracy levels such as "high," "medium" and "low."

Also, as used herein the "predetermined time or longer" refers to, for example, when the resident state continues for one hour or longer.

The invention of the eleventh aspect is an individual identification information processing method, wherein the mobile information terminals each extracts its charged state as location characteristics information representing the resident state when performing the determination of whether or not a mobile information terminal is in the resident state as in the invention of claim 7.

In other words, the present specification discloses the following invention according to the eleventh aspect.

The individual identification information processing method of claim 7, wherein
the mobile information terminal further comprises the steps of:
extracting information that the mobile information terminal is in the charged state as the location characteristics information representing the resident information of the mobile information terminal.

The invention of the twelfth aspect is an individual identification information processing method for identifying individuals using mobile information terminals, wherein the mobile information terminals each comprises a GPS function and detects location information, wherein locations and velocities of a plurality of mobile information terminals in question are extracted at an approximately same time from the detected location information, and wherein an information processing section of a management server compares and matches the information received from the mobile information terminals and identifies the mobile information terminal users.

In other words, the present specification discloses the following invention according to the twelfth aspect.

An information processing method for identifying users of mobile information terminals, the information processing method including a plurality of mobile information terminals each comprising a GPS function for detecting location information, and a management server connected to the mobile information terminals via a communication network, for using and processing location information sent from the mobile information terminals, wherein
the mobile information terminals each comprises the steps of:
detecting the location information with a GPS function;
recording a location, a velocity and time information at an approximately same time from the detected location information; and
sending the location, the velocity and the time information to the management server,
and wherein the management server comprises the steps of:
storing the location, the velocity and the time information sent and obtained from the mobile information terminals in a third database (DB 3); and
identifying users of the mobile information terminals based on the comparison of the location and/or the velocity of a plurality of mobile information terminals at an approximately same time from the location, the velocity and the time information sent and obtained from the plurality of mobile information terminals.

Note that the "at an approximately same time" of the twelfth aspect refers to a point of time with about 30 minutes of time tolerance when the plurality of mobile information terminals extract their respective location characteristics information. The time tolerance varies depending on the location information, etc. in such a way, for example, that the closer a plurality of mobile information terminals in question are with one another, the smaller the time tolerance is made, and the farther those mobile information terminals are with one another, the larger the time tolerance is made, but if, for example, the distance between two mobile information terminals in question is 100 m or less, the time tolerance of 1 min. may be set, and if the distance is 1 km or more, the time tolerance of 10 min. may be set.

The invention of the thirteenth aspect is an individual identification program for causing a computer to implement the individual identification information processing method of any one of the seventh through twelfth aspects.

The invention of claim 14 is an individual identification program storage medium for storing an individual identification program for causing a computer to implement the individual identification information processing method of any one of the seventh through twelfth aspects.

According to the present invention, individuals using mobile information terminals may be identified based on users' resident characteristics information and dynamic characteristics information included in the location information obtained by the mobile information terminals.

The present system may identify an identical individual even when the identical individual owns a plurality of user IDs or a plurality of mobile information terminals.

Also, present system may identify individuals even when users have not registered their respective personal information. Thus, a network service administrator may obtain a control such that he or she may anonymously and equally provide each individual with a user access right. Accordingly, the cost required for the registration may be significantly and advantageously cut down. By eliminating the necessity to register personal information, the concern over the leakage of personal information will also be eliminated from the network service administrator, and the number of concerned users, hesitating to register themselves before using the service, may be reduced.

Further, according to the present invention, individuals who change their user names may also be identified as long as their resident characteristics information remains unchanged. Since, the resident characteristics information is obtained from the resident information at homes, workplaces, schools, etc. in the real space, even when individuals change their user names, they can be identified unless their daily life and behavior change due to moves, work transfers, job changes school transfers, etc. in the real world. Thus, even when a user violated the terms of use in a social network service or the like, and later changes his/her user name and attempts to use the same network service, the network service administrator may be able to identify the user unless the user changes his/her real-world life and behavior; therefore, it is advantageous to the network service maintenance by allowing the network service administrator to, for example, restrict the user's service usage.

Also, according to the present invention, each user only needs to use a mobile information terminal with the GPS function and do not need to obtain a biometrics authentication device, etc., and therefore, the present invention allows user identification while enabling a large-scale network sever in which users can easily enroll.

BRIEF DESCRIPTION OF THE DRAWINGS

FIG. 3 is an example data structure of a user ID database for access permission according to the first embodiment of the present invention;

FIG. 4 is an example data structure of a resident characteristics information database according to the first embodiment of the present invention;

FIG. 5 is an example data structure of an ID database for user identification according to the first embodiment of the present invention;

DETAILED DESCRIPTION OF THE INVENTION

Figure 1:
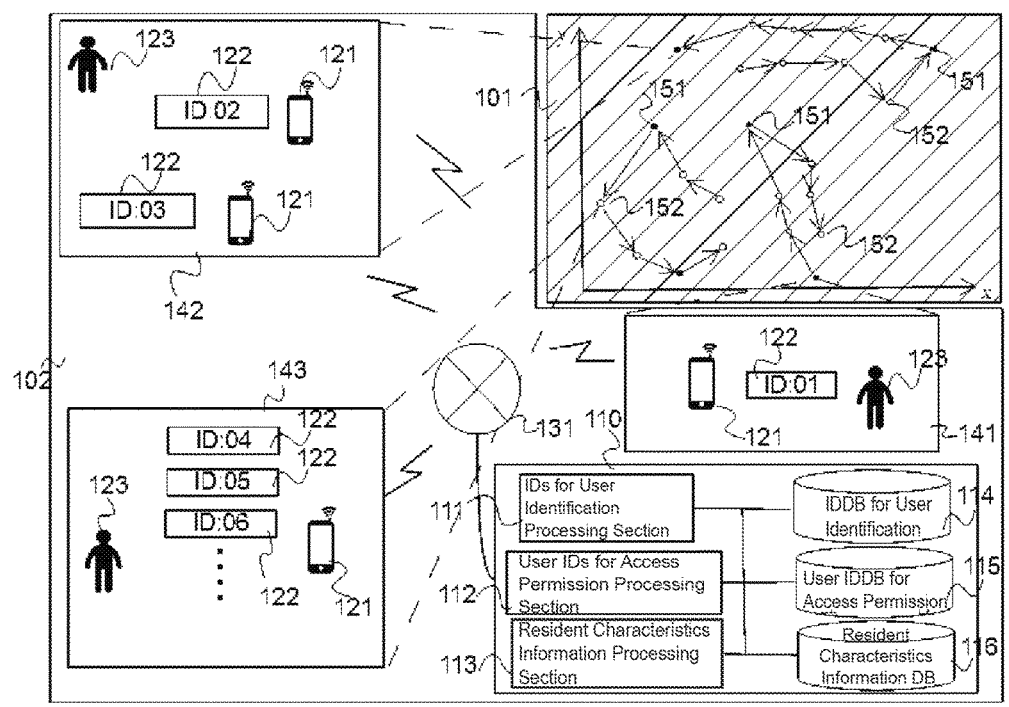
FIG. 1 is a conceptual diagram of an individual identification information processing system based on resident characteristics information according to a first embodiment of the present invention.

Embodiments of the present invention will be described below using the accompanying drawings.

First Embodiment of the Present Invention

First, an individual identification information processing system based on resident characteristics information will be described below.

A section 101 of FIG. 1 (shaded section in FIG. 1) shows a conceptual diagram of location (position) information recorded when an individual 123 moves in real space with a mobile information terminal (hereinafter, referred to "mobile information terminal"), wherein the individual 123 is a user of the mobile information terminal which uses a network service; and a section 102 of FIG. 1 (sections other than the shaded section in FIG. 1) shows a conceptual diagram of the individual identification information processing system based on the resident characteristics information.

The individual identification information processing system comprises a large number of mobile information terminals 121 each connected with a communication network 131, and a management server 110 connected to the mobile information terminals 121 via the communication network 131. When connecting with a communication network service comprising the individual identification information processing system, the individual 123 as the user of the mobile information terminal uses a user ID 122.

In FIG. 1, each of areas 141-143 shows a mobile information terminal 121 and the user ID 122 which the individual 123 as the user has rights to use.

The management server 110 provides the individual 123, as the user of the mobile information terminal 121, with the network service. In the present embodiment, the network service provides a user authentication service when the individual 123 as the user of the mobile information terminal 121 accesses the network 131, and a service for identifying the individual 123 as the user of the mobile information terminal 121 by storing and processing information sent from the mobile information terminal 121.

Although a hardware configuration of the management server 110 is not shown in the figure, the management server 110 is composed of a processor (CPU), a memory, a hard disk, etc. and executes application programs characteristic of the present invention to thereby enable processing according to the present invention.

Similar to, for example, a smartphone or a cellphone, the mobile information terminal 121 comprises functions for obtaining location information such as a GPS signal receiving function for receiving radio waves from a GPS satellite and detecting location information. As used herein, the term "location information" refers to numeric values indicating a specific location on the earth such as a latitude, a longitude and an altitude. This location information may be two- or three-dimensional information. The location information may be obtained through the GPS function as well as a gyroscope, a barometer, an acceleration sensor, and location information obtained from, for example, a cellular base station or a Wi-Fi access point. Also, the location information acquisition is not limited to these methods and may be achieved through other methods. The mobile information terminal may be one carried by a person as well as one which is part of a machine such as a vehicle, an airplane or a ship.

Although a hardware configuration of the mobile information terminal is not shown in the figure, the mobile information terminal is composed of a processor (CPU), a memory, a hard disk, a communication antenna, a GPS signal receiver, etc. and executes application programs characteristic of the present invention to thereby enable processing according to the present invention.

The communication network 131 carries wireless and wired communications over the Internet. This network is not limited to the Internet and may be any of other private networks.

Figure 2:
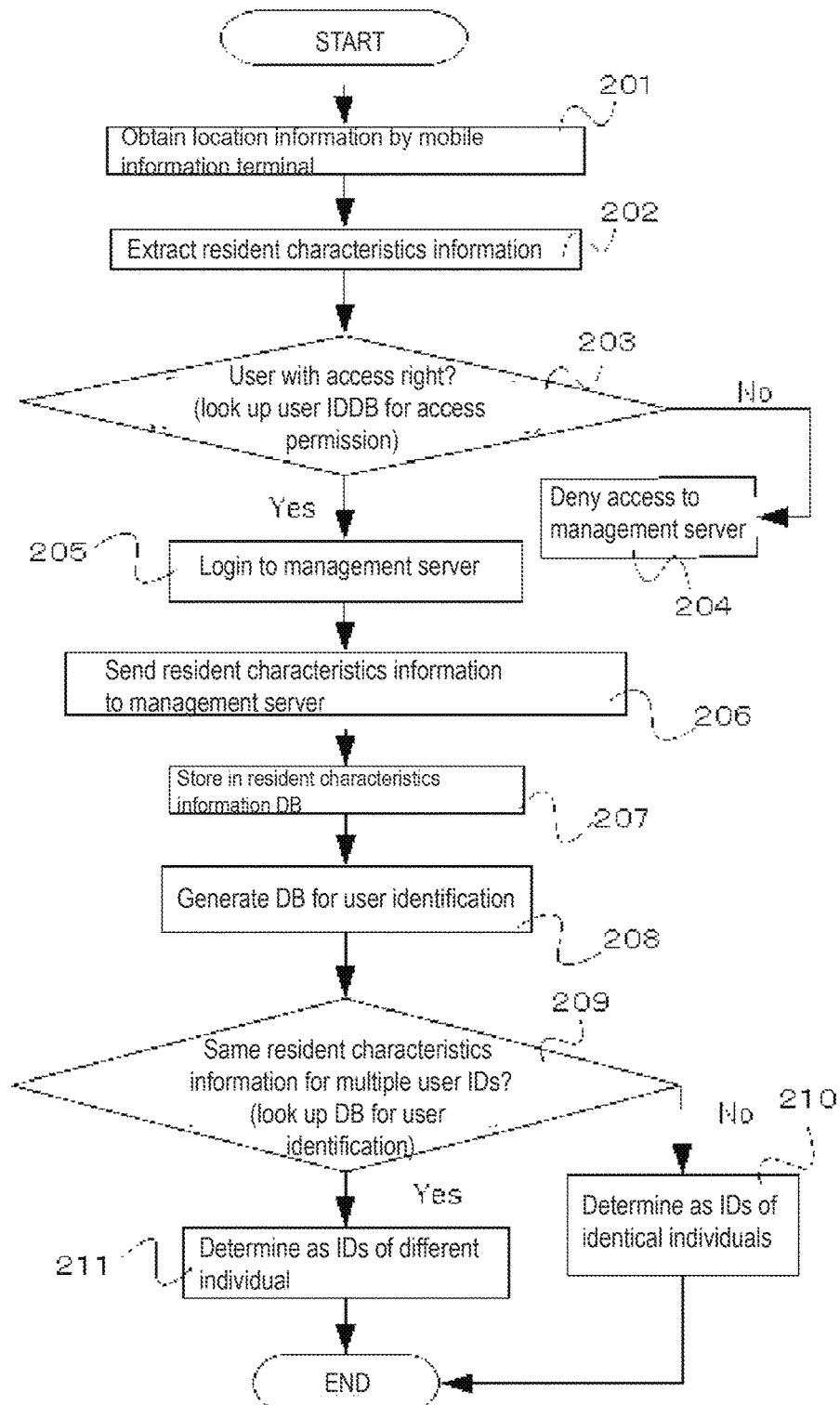
FIG. 2 is a flowchart showing processing of the individual identification information processing system based on the resident characteristics information according to the first embodiment of the present invention.

Next, operations of the individual identification information processing system according to the present invention will be discussed with respect to a flowchart of FIG. 2.

The individual 123 as the user carries the mobile information terminal 121 and moves in the real space. Thus, detecting the location information by means of the mobile information terminal 121 on a regular basis enables recording of the location information such as location information 151 or 152 in the section 101 of FIG. 1. The location information with characteristics indicating a stationary state or a small-movement state at a particular place for a predetermined time or longer ("resident state") is shown as resident characteristics information 151. The location information with behavioral characteristics other than the resident characteristics is shown as location information 152 (hereafter, referred to as "nonresident characteristics information"). This location information may be two- or three-dimensional information.

The resident characteristics information is obtained and extracted by the mobile information terminals 121 comprising the GPS function (201, 202). Note that the nonresident characteristics information 152 is not extracted. In the present embodiment, the resident characteristics information is extracted by the mobile information terminal 121, but may also be extracted by the management server 110.

When the user 123 having the mobile information terminal 121 connects with the communication network service comprising the individual identification information processing system, the management server 110 communicates with the mobile information terminal 121 and provides the network service by permitting communication for the user ID with access authority registered in a user ID database for access permission (hereafter, simply referred to as a "user IDDB for access permission") 115 (203-205). An example of data structure of the user IDDB for access permission 115 is shown in FIG. 3. In the present embodiment, the user uses the mobile information terminal 121 to send the user ID 122 and a password to the management server 110 to validate the user's access right, but this authentication may also be done by biometrics authentication.

Next, the resident characteristics information 151 is sent from the mobile information terminal 121 to the management server 110 via the communication network 131 (206) and recorded in a resident characteristics information database (hereinafter, simply referred to as a "resident characteristics information DB") 116 (207). In the resident characteristics information DB, as shown in the data structure example of FIG. 4, each user ID 122 for access permission is associated with the resident characteristics information 151. One user ID preferably comprises two or more items of resident characteristics information, but may comprise one item of the resident characteristics information.

When each individual 123 as the user moves in the real space carrying the mobile information terminal (101), different resident characteristics information 151 is obtained for each individual 123 as the user as shown in the section 101 of FIG. 1. Thus, different users yield different resident characteristics information (401-404) stored for each user ID in the resident characteristics information DB 116, and an identical user would yield identical resident characteristics information (401-404). For example, user IDs 01 (421) and 02 (422) in FIG. 4 have different resident characteristics information 1 (401), and therefore, these user IDs 01 and 02 may be identified as of separate users. On the other hand, user IDs 02 (422) and 03 (423) have identical resident characteristics information (401, 402), and therefore, these user IDs 02 and 03 may be identified as of an identical user.

Further, from the resident characteristics information (401, 402) of the resident characteristics information DB 116, IDs for user identification 502 are generated, as shown in the example data structure of an ID database for user identification of FIG. 5, and the ID database for user identification (hereinafter, simply referred to as an "IDDB for user identification") 114 is generated in association with user IDs for access permission 501 (208).

With this IDDB for user identification 114, user IDs for access permission 501 associated with an identical ID 502 may be readily determined as of an identical individual, and user IDs for access permission 501 associated with different IDs 502 may be readily determined as of different individuals (209-211). Accordingly, for example, network service administrator may perform processing such as limiting an access right to one user ID for access permission for each individual as a user.

Second Embodiment of the Present Invention

Next, an individual identification system will be described below, wherein this system extracts the resident characteristics information, which is the location information for the resident state, and identifies an individual as a user, in an example where an individual as a user uses a mobile information terminal utilizing a network service and has a behavior of living in a residence and working at a predetermined workplace.

When the individual carrying the mobile information terminal spends time at his/her home or workplace, detecting the individual's location information using the mobile information terminal allows recording of the individual's resident characteristics information using the resident state of the mobile information terminal. Almost all individuals carrying and using a mobile information terminal exhibit the resident state at their respective particular domiciles. Also, they often exhibit the resident state at their respective workplaces or schools. Thus, the mobile information terminal 121 of FIG. 1 allows extraction of its location information as the resident characteristics information 151 when its user is spending time at his/her home, workplace or school. Here, the user's resident characteristics information allows extraction of two location information items, i.e. one from when the user is at home and one at workplace, as the resident characteristics information 151, and recording of the resident characteristics information 151 in the resident characteristics information DB 116 via the communication network 131 after the user authentication. Since different users have different homes and workplaces, associating users with their respective homes and workplaces as user-specific resident characteristics information enables to identify the users by comparing the resident characteristics information of each user. The user identification capability will become even higher if the resident characteristics information for home and workplace are used in combination rather than separately as the users' resident characteristics information.

The IDDB for user identification of FIG. 5 is an example of generating IDs for user identification from the resident characteristics information DB of FIG. 4. Here, an X coordinate value 411 and a Y coordinate value 412 of the respective resident characteristics information 1 (401), and an X coordinate value 413 and a Y coordinate value 414 of the respective resident characteristics information 2 (402) of the resident characteristics information DB 116 are numerically and sequentially connected from left to yield each ID for user identification 502 of the IDDB for user identification of FIG. 5. When an identical individual carries a mobile information terminal, the individual's behavior in the real space is unique and his/her resident characteristics information 151 will be also identical. For this reason, for an identical individual, the ID for user identification 502 will be an identical value, and for another individual, the ID for user identification 502 will be a different value.

Even when an identical individual has two or more mobile information terminals or uses two or more user IDs for access permission, the ID for user identification 502 will be an identical value. For example, user IDs for access permission 511 and 514 of FIG. 5 may be identified as of separate individuals since the user IDs 511 and 514 have different IDs for user identification. Whereas, the user IDs 511 and 512 have an identical ID for user identification, and therefore, may be identified as of an identical individual. Thus, an identical ID for user identification may be identified as of an identical individual, and different IDs for user identification may be identified as of different individuals.

While the generation of IDs for user identification has been described, it is not limited to these methods and may be achieved through other methods.

Next, "methods for extracting the resident characteristics information" will be described by illustrating three specific methods.

To begin, as a first method, a "determination method by the location information" will be discussed. In this method, the location information detected from a mobile information terminal is extracted as the resident characteristics information when the location information is in the resident state.

As used herein the "resident state" refers to a state of continual stay at a particular place in a stationary state or a small-movement state for a predetermined time or longer. Preferably, the "particular place" has space with a size roughly equivalent to that of a home, a workplace, a school, etc. where a building exists, but the "particular place" may have larger space of, for example, a city block or a town. As used herein the "small-movement state" refers to a state of slight movement and is exemplified by moving within a building such as a home, a workplace, a school, etc. Here, the slight movement determined to be in the small-movement state may vary depending on the building size, etc. This is due to various amounts of the mobile information terminal movement depending on the building size, etc. For example, movement within a home grid with a side length of 10 m and movement within a school grid with a side length of 300 m may be determined to be in the "small-movement state."

The length of the "state of continual stay for a predetermined time" may be, for example, one hour or longer, or may be even longer. Also, two or more items of the resident characteristics information is preferably obtained per day, but only one item may also be obtained per day. The resident state is detected for one or more days, but may be detected for more days. Also, the resident characteristics information may be detected for a plurality of days and the resident characteristics information from the day of the highest frequency may be extracted.

Here, a "method for determining the resident state from the location information" will be discussed in three specific examples.

First, a "region method" will be described below. In this method, as shown in FIG. 6, location information space is segmented into specific regions, and if the location information obtained from a mobile information terminal on a regular basis continually remains in one of the regions for a predetermined reference time or longer, the mobile information terminal is determined to be in the resident state.

The location information space may be two- or three-dimensional information. When the location information space is two-dimensional, it is preferably meshed into square-shaped regions, but the space may be segmented into other shapes. When the location information space is three-dimensional, it is preferably segmented into cubical regions, but the space may be segmented into other shapes.

Figure 6:
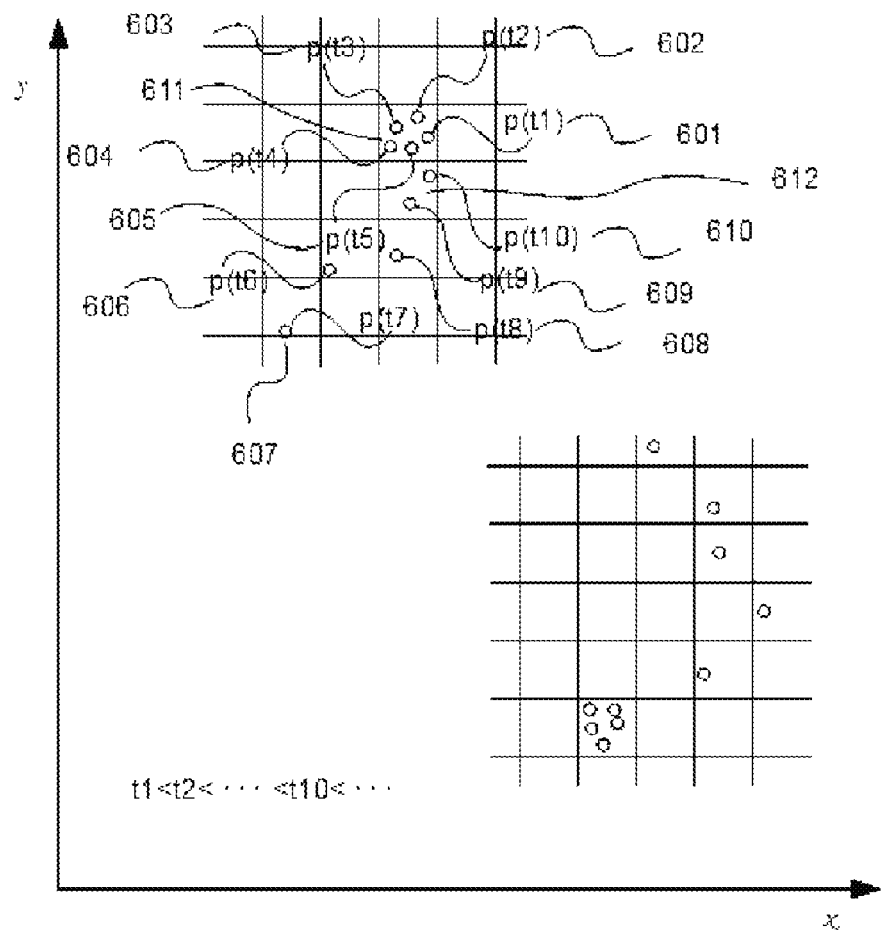
FIG. 6 is an explanatory view of a "region method" according to a second embodiment of the present invention.

In FIG. 6, the region method is illustrated in two-dimensional location information space. It is assumed that the mobile information terminal stayed within a specific region 611 for location information items 601-605 obtained at time t1-t5 obtained every 15 minutes. If the time length from time t1 to t5 is equal to or greater than a predetermined reference time, the state for 601-605 is determined as the "resident state." Also, if the location information 609 and 610 for time t9 and t10 are also within an identical region 612, but if the time length from time t9 to t10 is less than the predetermined reference time, the state 609-610 is determined as not the "resident state."

The side length of the grid, which shapes the regions, may be adjusted and changed according to the size of a building of residence or the like and nature of the resident characteristics information. For example, the grid dimension may be set to 10 m longitudinally and 10 m laterally, but during the daytime, the side length may be adjusted to, for example, 30 m. A region shape may be other than square and may be polygonal or the like.

The interval between the regular acquisitions of the location information by the mobile information terminal may be changed depending on the mobile information terminal's communication environment, accuracy of the obtainable location information, etc.

The "predetermined reference time" may be, for example, one hour or longer, or may be even longer.

Next, a "distance method" will be discussed. This method involves obtaining the location information by the mobile information terminal on a regular basis and calculating the distance between the obtained location information items. Then, the calculated distances will be totaled between one location information and another location information after a predetermined time length, and if the total distance is equal to or less than a certain reference value, the resident state is determined. The location information may be two- or three-dimensional information.

Figure 7:
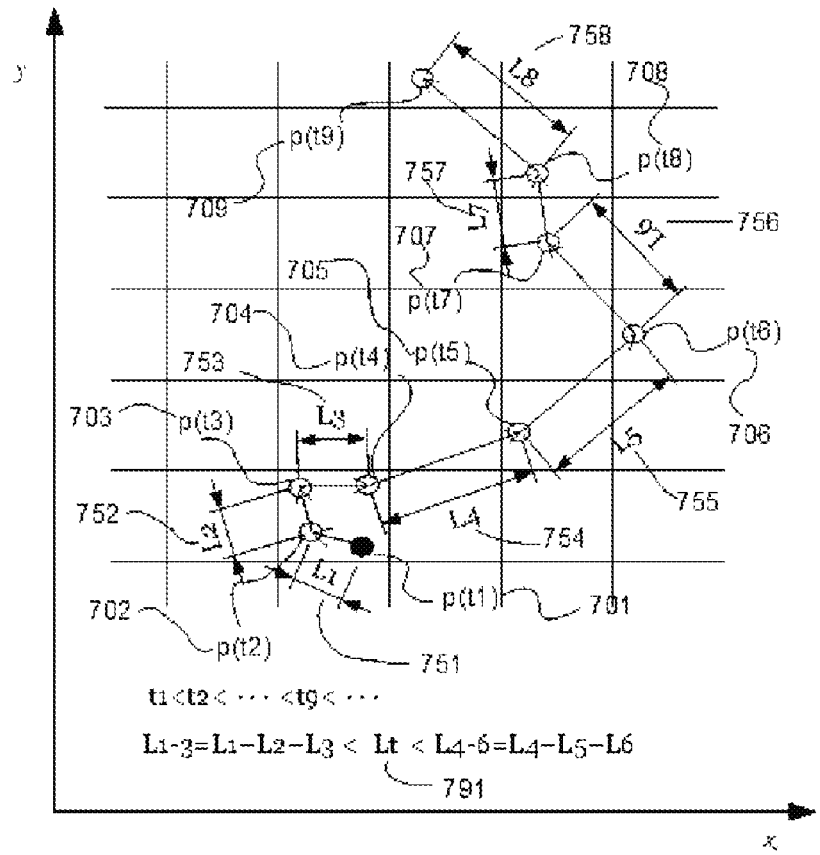
FIG. 7 is an explanatory view of a "distance method" according to the second embodiment of the present invention.

In FIG. 7, the distance method is illustrated in two-dimensional location information space. If the location information items 701-704 are obtained from the mobile information terminal every 30 minutes between time t1 and t4, and if the total of respective distances between t1 and t2, t2 and t3, and t3 and t4 between the location information items 701 and 704 (i.e., the total of 751-753) is less than a predetermined reference distance 791, the state between 701 and 704 is determined as the resident state. Also, if the location information items 704-708 are obtained between time t4 and t8, and if the total of respective distances between t4 and t5, t5 and t6, and t6 and t7 between the location information items 704 and 708 (i.e., the total of 754-757) is equal to or greater than the predetermined reference distance 791, the state between 704 and 708 is determined as not the "resident state."

Next, a "velocity method" will be described below. This method involves obtaining the location information by the mobile information terminal on a regular basis and calculating a velocity at each time point, wherein if the average velocity at one time point is equal to or less than a predetermined reference velocity, the resident state is determined. The location information may be two- or three-dimensional information.

Figure 8:
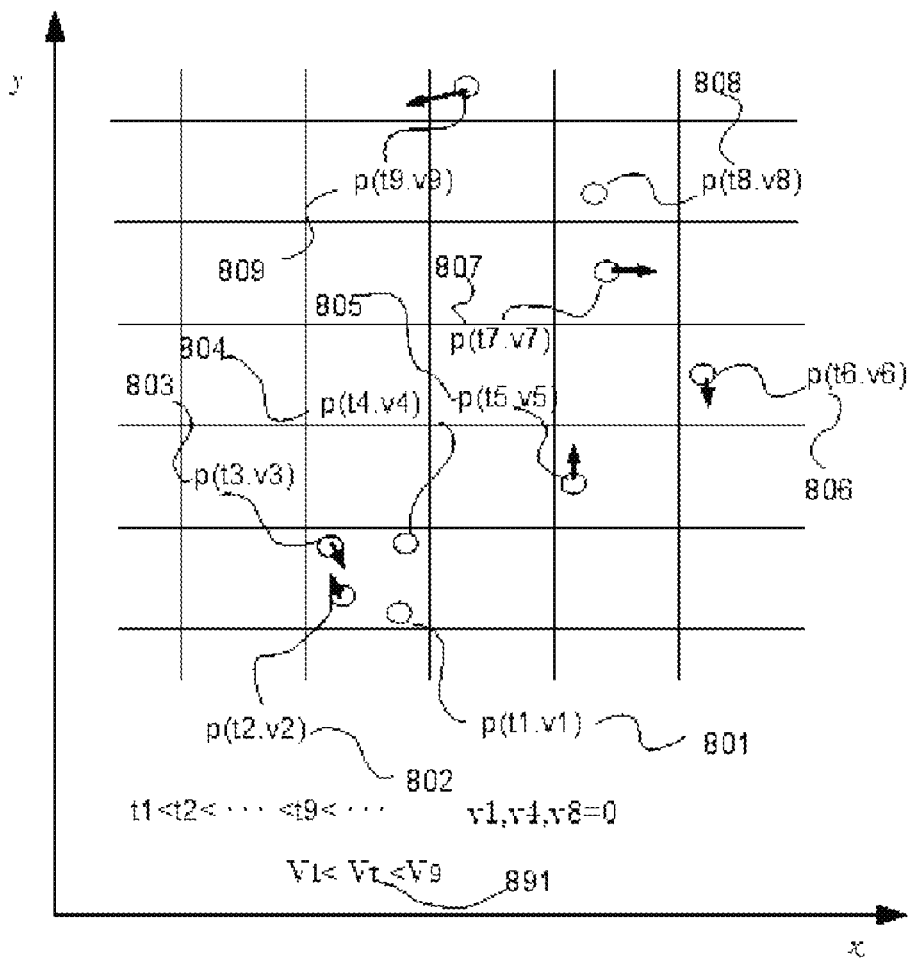
FIG. 8 is an explanatory view of a "velocity method" according to the second embodiment of the present invention.

In FIG. 8, the velocity method is illustrated in two-dimensional location information space. If the location information items 801-804 are obtained from the mobile information terminal every 30 minutes between time t1 and t4, and if the average velocity of the location information items 801-804 is less than a predetermined reference velocity 891, the state between 801 and 804 is determined to be the resident state. Also, if the location information items 805-808 are obtained between time t5 and t8, and if the average velocity between the location information items 805 and 808 is equal to or greater than the predetermined reference velocity 891, the state between 805 and 808 is determined as not the "resident state."

The "method for determining the resident state from the location information" has been discussed above in the three specific examples, but this method is not limited to these methods and other methods may be employed.

Next, as a second method, a "determination method by positioning accuracy" will be discussed. This method takes advantage of the known inaccuracy of GPS positioning in buildings; that is, when the mobile information terminal detects its own location information by the GPS function, if low positioning accuracy continues for a predetermined reference time or longer, the resident characteristics information is determined. The location information may be two- or three-dimensional information.

Figure 9:
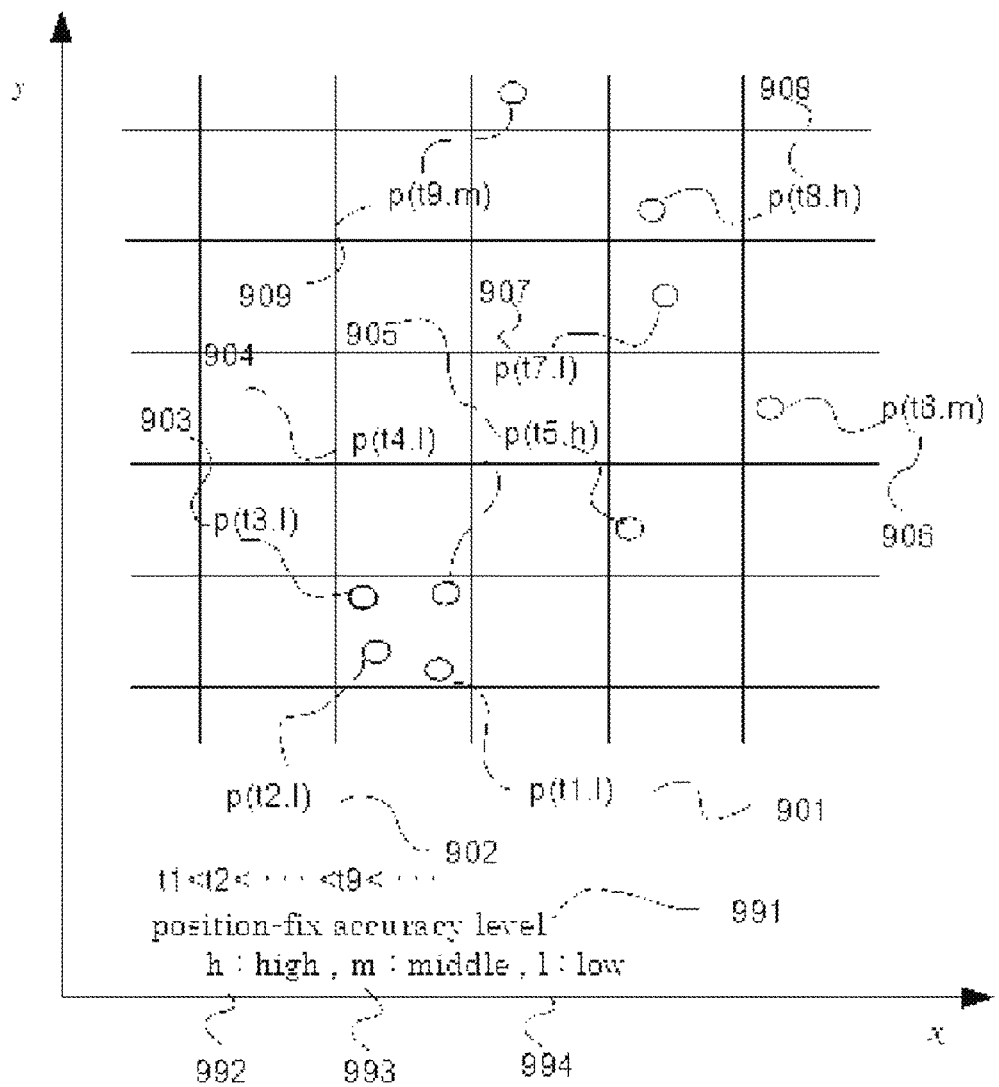
FIG. 9 is an explanatory view of a "determination method by positioning accuracy" according to the second embodiment of the present invention.

In FIG. 9, the determination method by positioning accuracy is illustrated in two-dimensional location information space. It is assumed that the mobile information terminal obtains and records the location information and the positioning accuracy on a regular basis, and that the positioning accuracy is categorized into three accuracy levels such as "high," "medium" and "low" (991). If the location information items 901-904 are obtained from the mobile information terminal at a predetermined time interval between time t1 and t4, and if the positioning accuracy at each point is continually at the "low" level 994 for a predetermined reference time or longer, the state between 901 and 904 is determined as the resident state. Also, if the location information items 905-908 are obtained between time t5 and t8, and if the positioning accuracy between the location information items 905 and 908 is continually at the "low" level 994, but for less than a predetermined reference time, the state between 905 and 908 is determined as not the "resident state.

Also, usage of the location information is hindered when the positioning accuracy is low with location information errors, it is preferred to use the location information immediately preceding the decrease of the positioning accuracy as the resident characteristics information. The predetermined reference time may be, for example, one hour or longer, or may be even longer.

Next, as a third method, a "determination method by electrical charge state" will be discussed. This method involves obtaining the location information as resident state information when the mobile information terminal is fully charged. Places where mobile information terminals are charged are often homes or workplaces of respective individuals as users where the mobile information terminals enters the resident state. The location information may be two- or three-dimensional information.

Figure 10:
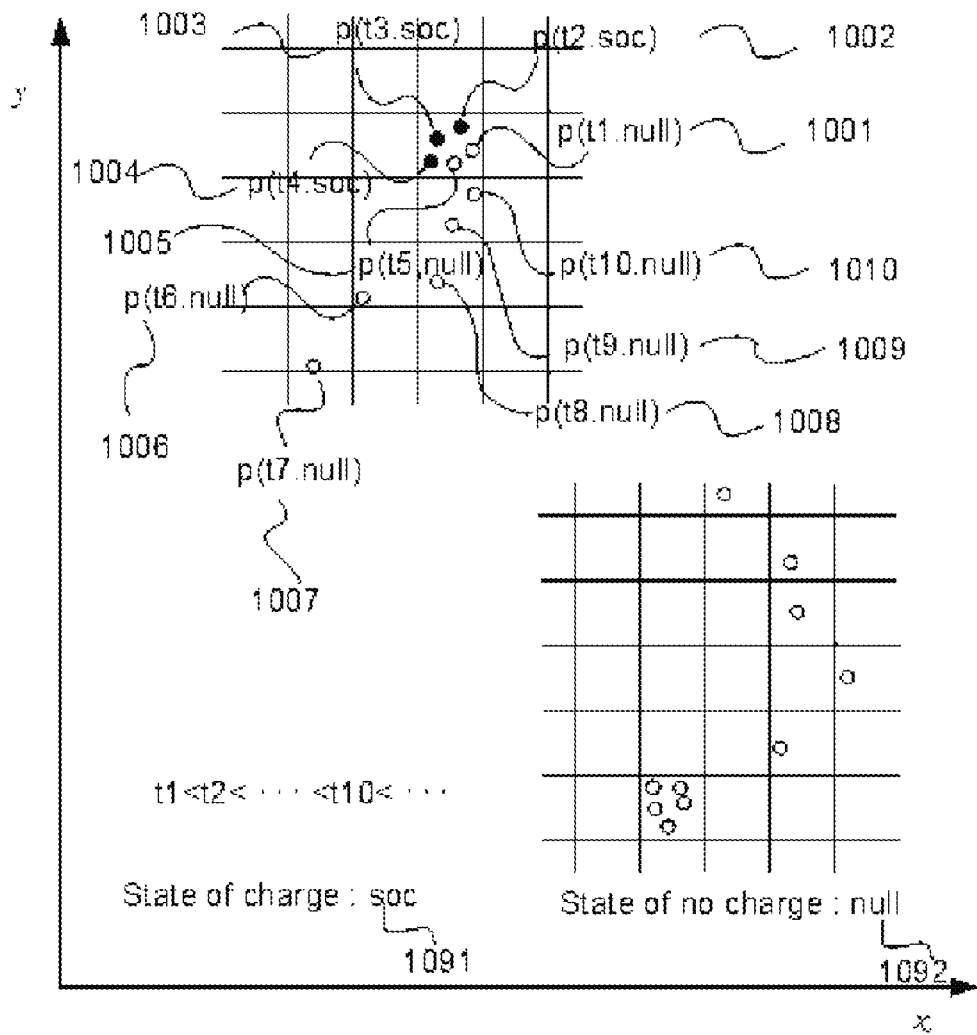
FIG. 10 is an explanatory view of a "determination method by electrical charge state" according to the second embodiment of the present invention.

In FIG. 10, the determination method by electrical charge state is illustrated in two-dimensional location information space. It is assumed that the mobile information terminal detects and records the location information and the electrical charge state on a regular basis, and that the detected electrical charge state is, for example, either a "charged state" 1091 or a "uncharged state" 1092. If the mobile information terminal obtains the location information, for example, every hour, and if it obtained the location information 1002 at time t2 when it was in the "charged state" 1091, the mobile information terminal is determined to be in the resident state at the location of the location information 1002.

While the method for determining the resident characteristics information has been described for three specific examples, it is not limited to these methods and may be achieved through other methods.

Third Embodiment of the Present Invention

Next, an individual identification information processing system based on dynamic characteristics information will be described below.

Figure 11:
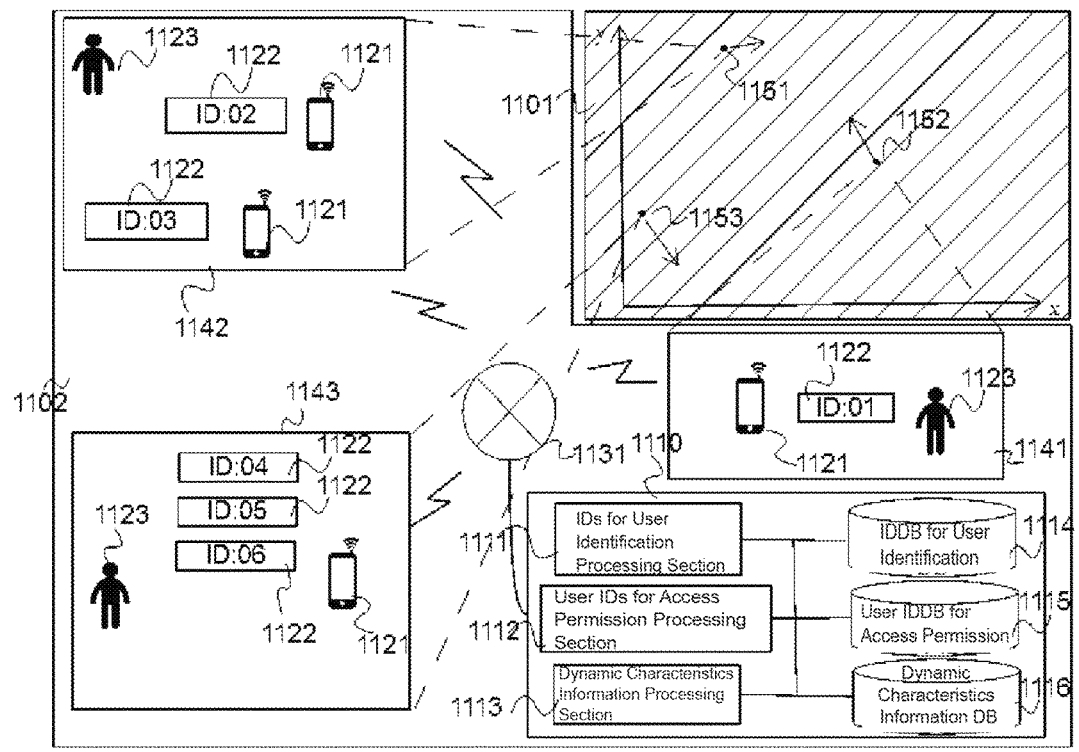
FIG. 11 is a conceptual diagram of an individual identification information processing system based on dynamic characteristics information according to a third embodiment of the present invention.

A section 1101 of FIG. 11 (shaded section FIG. 11) shows a conceptual diagram of location information where a plurality of individuals 1123 as users of mobile information terminals exist almost simultaneously in the real space. The location information of each user almost at identical time is indicated with 1151-1153. A section 1102 of FIG. 11 (sections other than the shaded section in FIG. 11) shows a conceptual diagram of the individual identification information processing system based on the dynamic characteristics information.

The individual identification information processing system comprises a large number of mobile information terminals 1121 each connected with a communication network 1131, and a management server 1110 connected to the mobile information terminals 1121 via the communication network 1131. When connecting with a communication network service comprising the individual identification information processing system, the respective individual 1123 as each user of the mobile information terminal uses a user ID 1122.

In FIG. 11, each of areas 1141-1143 shows a mobile information terminal or mobile information terminals 1121 and the user ID or IDs 1122 which the individual 123 as the user has rights to use. Since there is an area within which each user may exercise the rights to use his/her mobile information terminal or user ID as discussed above, the area is called "user usage right area."

The management server 1110 provides the user 1123 of the mobile information terminal 1121 with the network service. In the present embodiment, the network service provides a user authentication service when the user accesses the network, and a service for identifying the individual 123 as the user of the mobile information terminal 1121 by storing and processing information sent from the mobile information terminal 121.

Although a hardware configuration of the management server 1110 is not shown in the figure, the management server 110 is composed of a processor (CPU), a memory, a hard disk, etc. and executes application programs characteristic of the present invention to thereby enable processing according to the present invention.

Similar to, for example, a smartphone or a cellphone, the mobile information terminal 1121 comprises functions for obtaining location information such as a GPS signal receiving function for receiving radio waves from a GPS satellite and detecting location information. The location information refers to numeric values indicating a specific location on the earth such as a latitude, a longitude and an altitude. The location information may be obtained through the GPS function as well as a gyroscope, a barometer, an acceleration sensor, etc. The mobile information terminal may be one carried by a person as well as one which is part of a machine such as a vehicle, an airplane or a ship.

Although a hardware configuration of the mobile information terminal 1121 is not shown in the figure, the mobile information terminal 1121 is composed of a processor (CPU), a memory, a hard disk, a communication antenna, a GPS signal receiver, etc. and executes application programs characteristic of the present invention to thereby enable processing according to the present invention.

The communication network 1131 carries wireless and wired communications over the Internet. This network may be the Internet as well as any of other private networks.

Figure 12:
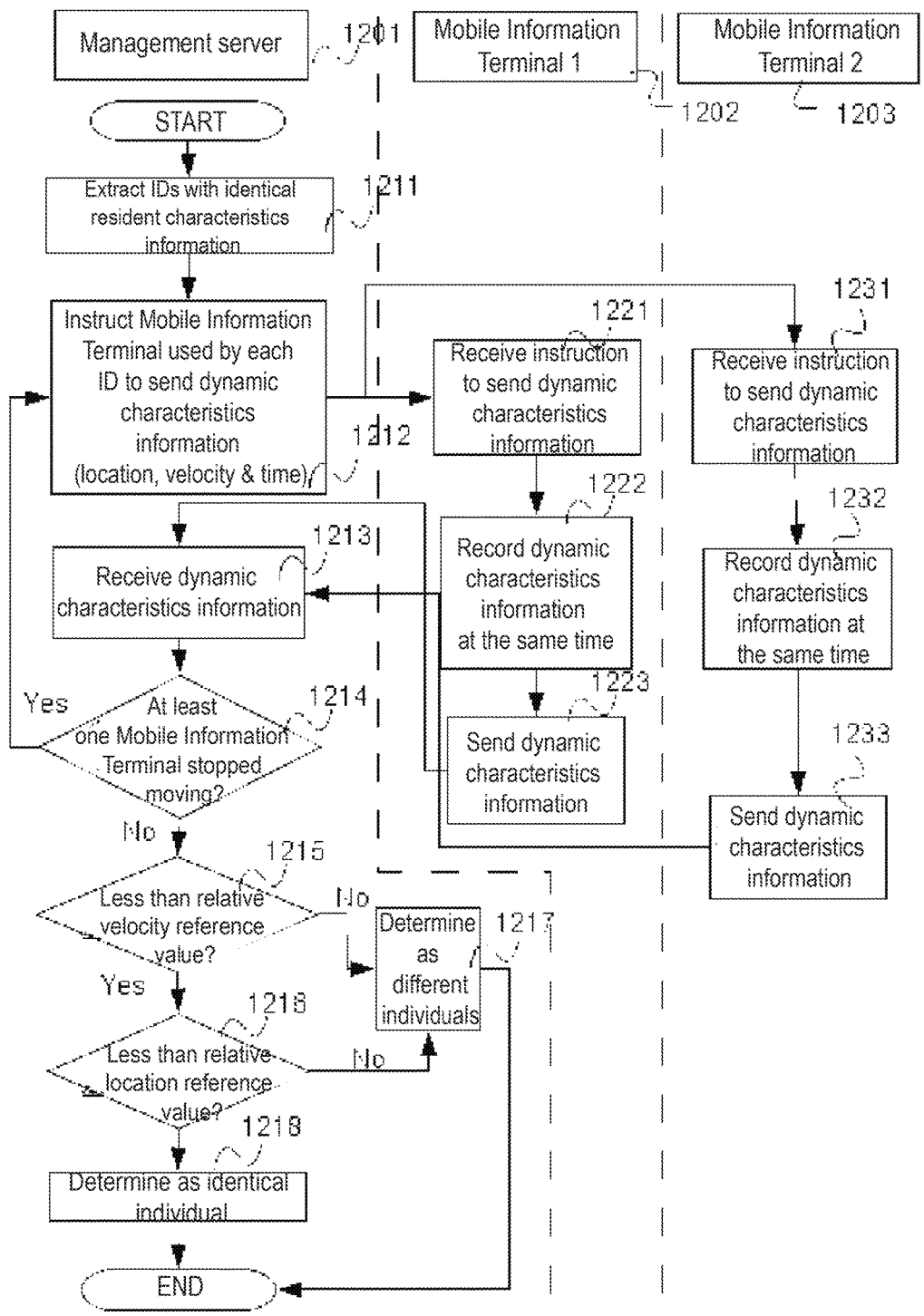
FIG. 12 is a flowchart showing processing of the individual identification information processing system based on the dynamic characteristics information according to the third embodiment of the present invention.

Next, operations of the individual identification information processing system according to the present invention will be discussed with respect to a flowchart of FIG. 12.

The individual 1123 as the user carries the mobile information terminal 1121 and moves in the real space. Thus, detecting the location information with the mobile information terminal almost simultaneously yields the location information such as location information items 1151, 1152 or 1153 in the section 1101 of FIG. 11. Among these location information items, 1151 and 1153, for example, indicate the "dynamic characteristics information," which is location characteristics information representing a state of simultaneous movement by a plurality of mobile information terminals. The location information 1152 is assumed to indicate the stationary state. The dynamic characteristics information may be the mobile information terminal's information such as a location and a velocity as well as an acceleration and a vibration, but the present embodiment is discussed with an example where the dynamic characteristics information is the mobile information terminal's location and velocity taken at an approximately same time.

The present embodiment is a particular case of the first embodiment for implementing the individual identification information processing based on the resident characteristics information and identifying individuals comprising user IDs based on their dynamic characteristics information, wherein there exist an individual's user ID from which only one item of the resident characteristics information can be extracted, and another individual's user ID from which two or more items of the resident characteristics information can be extracted, and wherein those individuals have one overlapping item of the resident characteristics information. Here, these individuals have user usage right areas 1142 and 1143, respectively.

First, the management server (1201) extracts mobile information terminals (1202, 1203) of the users with identical resident characteristics information (1211), and instructs each of the mobile information terminals to send their dynamic characteristics information such as the location and the velocity at an approximately same time (1212). Each mobile information terminal receives the instruction (1221, 1231), detects and records the dynamic characteristics information almost simultaneously using the GPS function, etc. (1222, 1232) and sends the dynamic characteristics information to the management server (1223, 1233). The management server receives the dynamic characteristics information (1113) and uses a dynamic characteristics information processing section 1113 to verify if each mobile information terminal is in a stop state to check if each mobile information terminal is in a "moving state" at the time point in question (1214). If at least one of the mobile information terminals is in the stop state, the management server re-issues an instruction to send the dynamic characteristics information at the different time point and repeats this until non of the mobile information terminals are in the stop state (1214). Next, the dynamic characteristics information processing section 1113 calculates relative velocity and location between the two mobile information terminals, determines that each mobile information terminal is used by an identical individual if the relative velocity and location are less than predetermined reference relative values, respectively, assigns an identical ID to IDs for user identification for the two mobile information terminals, and records the identical ID in an IDDB for user identification 1114 (1215, 1216, 1218). If the relative values are equal to or greater than the predetermined reference relative values, respectively, the dynamic characteristics information processing section 1113 determines that each mobile information terminal is used by separate individuals (1215, 1216, 1217) and records different IDs for user identification in the IDDB for user identification 1114.

The "predetermined reference relative value" for the velocity, for example, is determined equal to or greater than a velocity difference of 20 km/hour or the like between the mobile information terminals being compared; and the "predetermined reference relative value" for the location is determined equal to or greater than a distance of 50 m or the like between the mobile information terminals being compared, but may be adjusted and changed depending on the positioning accuracy, etc. of the mobile information terminals.

As discussed above, the individual identification information processing system according to the third embodiment identifies individuals as users based on the user-specific dynamic characteristics information. The individual identification based on the resident characteristics information according to the first and second embodiments enables efficient identification of any one individual from majority of the other individuals. In the third embodiment, the individual identification is done based on the dynamic characteristics information when users cannot be identified due to the overlapping resident characteristics information.

According to the first through third embodiments, individuals who uses any mobile information terminal utilizing the network service may be identified.

Other Embodiments of the Present Invention

While preferred embodiments of the present invention have been shown, the invention is not limited by these embodiments and modifications thereof may be made without departing from the spirit and scope of the invention.

The present invention may be preferably utilized for individual identification for users in a network service, usage control over users by a network administrator based on the individual identification, a voting service by providing an equal usage right to individuals as users, an opinion survey service, an intention survey service and the like.

What is claimed is:

1. An individual identification information processing system for identifying users of mobile information terminals, the information processing system comprising a plurality of mobile information terminals each having a location information detection function, and a management server, connected to the mobile information terminals via a communication network, for using and processing location information sent from the mobile information terminals, wherein
each mobile information terminal comprises:
  a section for detecting location information of the mobile information terminal with the location information detection function;
  a section for extracting location characteristics information from the detected location information;
    wherein the location characteristics information includes:
    information representing a moving state in which the mobile information terminal is in motion at a specific time and at a specific location, and/or
    information representing a resident state in which the mobile information terminal is stationary at two or more different locations; and
  a section for sending the location characteristics information to the management server; and
  wherein the management server comprises an information processing section,
wherein said information processing section identifies a user of one or more mobile information terminals based on comparison of the location characteristics information sent and obtained from the plurality of target mobile information terminals,
  wherein the information representing a moving state in which a mobile information terminal is in motion includes information on location, velocity and time of the mobile information terminal, and wherein the information processing section, using the information on location, velocity and time obtained from the plurality of target mobile information terminals, identifies said user based on comparisons of locations and/or velocities of the plurality of target mobile information terminals at an approximately same time.

2. The individual identification information processing system of claim 1, wherein
the information processing section identifies said user based on information representing moving states in which the plurality of target mobile information terminals are in motion at an approximately same time.

3. The individual identification information processing system of claim 1, wherein
the mobile information terminal further comprises a section for extracting location characteristics information as information representing a resident state in which the mobile information terminal is stationary when positioning accuracy of the location information detection function is in a state in which it is continually equal to or less than a predetermined accuracy for a predetermined time or longer.

4. The individual identification information processing system of claim 1, wherein
the location information detection function of the mobile information terminal is a GPS function.

5. The individual identification information processing system of claim 1, wherein
the management server comprises a database (DBs 1-3) for storing the location characteristics information sent and obtained from the mobile information terminals.

6. A method used in an individual identification information processing system for identifying users of mobile information terminals, the individual identification information processing system comprising a plurality of mobile information terminals each having a location information detection function, and a management server connected to the mobile information terminals via a communication network, for using and processing location information sent from the mobile information terminals, the method comprising the steps of:
detecting, by each mobile information terminal, location information of the mobile information terminal with the location information detection function;
extracting, by each mobile information terminal, location characteristics information from the detected location information,
wherein the location characteristics information includes:
information representing a moving state in which the mobile information terminal is in motion at a specific time and at a specific location,
and/or
information representing a resident state in which the mobile information terminal is stationary at two or more different locations; and
sending, by each mobile information terminal, the location characteristics information to the management server,
processing information, by the management server, to identify a user of one or more mobile information terminals based on comparison of the location characteristics information sent and obtained from the plurality of target mobile information terminals,
wherein the information representing a moving state in which the mobile information terminal is in motion includes information on location, velocity and time of the mobile information terminal, and
wherein the step of processing information, using the information on location, velocity and time obtained from the plurality of target mobile information terminals, identifies said user based on comparison of locations and/or velocities of the plurality of target mobile information terminals at an approximately same time.

7. The individual identification information processing method of claim 6, wherein:
the step of processing information identifies said user based on information representing moving states in which the plurality of target mobile information terminals are in motion at an approximately same time.

8. The individual identification information processing method of claim 6, further comprising the step of:
extracting, by the mobile information terminal, location characteristics information as information representing a resident state in which the mobile information terminal is stationary when positioning accuracy of the location information detection function is in a state in which it is continually equal to or less than a predetermined accuracy for a predetermined time or longer.

9. The individual identification information processing method of claim 6, wherein:
the location information detection function of the mobile information terminal is a GPS function.

10. The individual identification information processing method of claim 6, further comprising the step of:
storing, by the management server, the location characteristics information sent and obtained from the mobile information terminals in a database (DBs 1-3).

11. A non-transitory computer program product used in an individual identification information processing system for identifying users of mobile information terminals, the individual identification information processing system including a plurality of mobile information terminals each having a location information detection function, and a management server connected to the mobile information terminals via a communication network, for using and processing location information sent from the mobile information terminals, the computer program product comprising computer program code for executing the steps of:
detecting, by each mobile information terminal, location information of the mobile information terminal with the location information detection function;
extracting, by each mobile information terminal, location characteristics information from the detected location information,
wherein the location characteristics information includes:
information representing a moving state in which the mobile information terminal is in motion at a specific time and at a specific location,
and/or
information representing a resident state in which the mobile information terminal is stationary at two or more different locations; and
sending, by each mobile information terminal, the location characteristics information to the management server; and
processing information, by the management server, to identify a user of one or more mobile information terminals based on comparison of the location characteristics information sent and obtained from the plurality of target mobile information terminals, wherein the information representing a moving state in which the mobile information terminal is in motion includes information on location, velocity and time of the mobile information terminal, and wherein the step of processing information, using the information on location, velocity and time obtained from the plurality of target mobile information terminals, identifies said user based on comparison of locations and/or velocities of the plurality of target mobile information terminals almost at the same time.

12. The computer program product of claim 11, wherein the step of processing information identifies said user based on information representing moving states in which the plurality of target mobile information terminals are in motion at an approximately same time.

13. The computer program product of claim 11, further comprising computer program code for executing the step of:

extracting, by the mobile information terminal, location characteristics information as information representing a resident state in which the mobile information terminal is stationary when positioning accuracy of the location information detection function is in a state in which it is continually equal to or less than a predetermined accuracy for a predetermined time or longer.

14. The computer program product of claim 11, wherein the location information detection function of the mobile information terminal is a GPS function.

15. The computer program product of claim 11, further comprising computer program code for executing the step of:

storing, by the management server, the location characteristics information sent and obtained from the mobile information terminals in a database (DBs 1-3).

* * * * *